United States Patent [19]

Gomez et al.

[11] Patent Number: 5,743,338
[45] Date of Patent: Apr. 28, 1998

[54] CONSERVATION IMPLEMENT INCLUDING A SHREDDER

[75] Inventors: Pompeyo Jaime Benavides Gomez; Antares Salvador Ortega de la Cruz; Raul Americo Reyes Gonzales; Senen Alfonso Arzate Ramirez, all of Monterrey Nuevo Leon; Jesus Esteban Garza Huerta, Guadalupe Nuevo Leon; Jose Rafael Garcia Villanueva, Monterrey Nuevo Leon, all of Mexico

[73] Assignee: Industrias John Deere S.A.de C.V., Monterrey N.L., Mexico

[21] Appl. No.: 741,078

[22] Filed: Oct. 30, 1996

[51] Int. Cl.⁶ ..................................... A01B 49/04
[52] U.S. Cl. ................... 172/28; 172/45; 172/71
[58] Field of Search ............... 56/504, 192; 111/101, 111/52, 185; 172/27, 28, 112, 45, 47, 52, 70, 71, 125, 142, 166, 776

[56] References Cited

U.S. PATENT DOCUMENTS

| | | |
|---|---|---|
| 511,658 | 12/1893 | Snodgrass . |
| 1,007,631 | 10/1911 | Bascue . |
| 1,689,718 | 10/1928 | Collins . |
| 2,649,678 | 8/1953 | Sishc . |
| 2,697,903 | 12/1954 | McKay . |
| 2,781,709 | 2/1957 | Caldwell . |
| 3,233,683 | 2/1966 | Lofshult . |
| 3,529,412 | 9/1970 | Meiners . |
| 3,601,202 | 8/1971 | Steffe . |
| 4,324,295 | 4/1982 | Weichel .................... 172/28 |
| 4,522,267 | 6/1985 | Lewison .................... 172/28 |
| 4,607,580 | 8/1986 | Monty, Jr. ................ 172/28 X |
| 4,690,224 | 9/1987 | Shwez ...................... 172/45 |

OTHER PUBLICATIONS

Deere & Co., Brochure entitled Cutters, Shredders, and Mowers, 24 pages, dated Aug. 1994, published in the U.S.A.
Mathews Company, advertisement entitled "M–C 12 Foot Flail Shredder", 2 pages, date unknown, published in the U.S.A.
Interstate Equipment and Manufacturing Corp., Spec Sheet entitled "Interstate Shredder–Bedder", 1 page, date unknown, published in the U.S.A.

*Primary Examiner*—Michael J. Carone
*Assistant Examiner*—Robert Pezzuto

[57] ABSTRACT

A conservation tillage implement including a shredder with a transverse rotor hood structure having one-piece end panels which are welded to each side of the hood and project rearwardly of the hood to receive a toolbar which extends the width of the implement. The center of the toolbar is connected to a pair of parallel upright central panels which are connected to the central rear portion of the hood. A reinforcing member extends from the central rear portion between the central panels around the top of the hood adjacent the hitch structure which connects the implement to a tractor. The end and central panels and reinforced hood structure define a compact, unobtrusive frame which is sturdy enough to pull heavy drawbar loads and resist heavy torque loading. In one embodiment of the invention, the toolbar supports a plurality of transversely adjustable deep tillage tools such as rippers, and disk structure is connected by adjustable bracket structure to the toolbar behind the rippers. Transversely adjustable lift and transport wheels may also connected to the toolbar, along with transversely adjustable down-limit members for limiting disk penetration and supporting the disk structure above the ground when the wheels are lowered to the transport position. A variety of earthworking tools, including those presenting a heavy draft load, can be mounted at different locations on the toolbar.

21 Claims, 4 Drawing Sheets

CONSERVATION IMPLEMENT INCLUDING A SHREDDER

BACKGROUND OF THE INVENTION

1) Field of the Invention

The present invention relates generally to agricultural tillage implements and more specifically to multi-function, single pass implements which include a shredder device.

2) Related Art

Many tillage practices require several steps after harvesting of a crop to prepare the soil for planting of the next crop. Typically after harvesting, the farmer must first shred crop residue, and then break the soil and prepare a seed bed suitable for planting. Several different implements often are used in separate field-working operations. Each operation usually requires at least one separate pass over the field with a tractor and implement. Therefore, operating costs are high and considerable time and energy is consumed in the soil preparation. Increased soil compaction occurs as a result of the multiple passes over the field. Because two or more implements are required for seed bed preparation, the initial cost for equipment is also relatively high.

Although multi-function conservation tillage tools are readily available on the market today, many fail to provide a good shredding function for crop residue which is present in fields where corn, sorghum or other heavy stalk crops have been harvested. Some conservation implements perform well in certain crop residue and soil conditions but are not particularly well adapted to other crops and field conditions, nor can they be easily modified for the different conditions.

Many attempts in the past to provide a combination shredder and tillage tool have met with only limited success. Some include trailing hitches connected by a large, heavy brace to the front drawbar for pulling implements such as a disk behind the shredder. Shredders with trailing hitches and pull-type implements can be difficult to transport, and controlling the rear implement during tillage operations sometimes is a problem. Deep tillage tools such as rippers usually can not be used effectively with the trailing hitch.

Combination structures having a stalk cutter and tillage tools, such as shown in U.S. Pat. No. 2,781,709, include a bell crank arrangement supporting a toolbar and ground engaging wheels. The linkages are often large, extend above the implement, and are suitable only for a relatively low profile cutter having a horizontally extending blade rotating about an upright axis. Another type of tool shown in U.S. Pat. No. 3,233,683 includes a stalk chopping device with a tool-supporting rod connected by special curved brackets to the rear of a stalk cutter. The rod and bracket construction has limited versatility and is suitable only for relatively light loads and not for loads that are encountered with deep tillage tools. U.S. Pat. No. 3,601,202 shows a toolbar mounted behind a shredder but fails to provide any teaching for effectively mounting the toolbar to the shredder frame to accommodate heavy draft loads.

BRIEF SUMMARY OF THE INVENTION

It is therefore an object of the present invention to provide an improved agricultural implement for conservation and conventional tillage. It is a further object to provide such a structure which overcomes most or all of the aforementioned problems.

It is a further object of the invention to provide an improved conservation and conventional tillage implement which effectively shreds crop residue prior to breaking or tilling the soil. It is another object to provide such an implement which has good soil and trash flow characteristics and is adaptable for operation in highly varying crop and field conditions.

It is a further object of the invention to provide an improved conservation and conventional tillage implement having a shredder and a trailing toolbar for mounting a variety of tillage tools to the shredder for single pass, multi-function operations. It is another object to provide such an implement which is easy to modify to accommodate different field and crop residue conditions.

It is a still another object of the invention to provide an improved conservation and conventional tillage implement having a shredder with at least one integral toolbar for mounting tillage equipment, including deep tillage tools. It is yet another object to provide such an implement which has a compact yet strong frame structure and which does not require large lift frames or other lift structure extending over the shredder. It is a further object to provide a versatile tool mounting arrangement for such an implement for supporting a variety of trailing tillage implements, including disks and deep tillage tools, in both the field working and transport positions, and is adaptable for either tow bar hitch or three-point hitch mounting.

A tillage implement constructed in accordance with the above objects includes a shredder having a transverse rotor with flails rotatable about an axis transverse to the forward direction. The shredder includes transverse metal curved hood structure defining a rotor compartment. One-piece end panels are connected to each side of the hood structure and extend rearwardly from the shredder. The aft portions of the end panels include apertures conforming to the cross section of a toolbar which extends the width of the implement and projects through the apertures. The toolbar is welded to the panels which also support belt drive structure connected to a power take off (PTO) drive through transverse shafts extending outwardly from a central drive location adjacent the implement hitch structure. The toolbar, offset a substantial distance rearwardly from the hood structure and located a substantial distance above a horizontal plane passing through the rotor axis, provides convenient operator access to the various adjustable brackets and facilitates fore-and-aft staggering of tools that are transversely spaced on the toolbar. An additional toolbar may also be added to the first toolbar.

The center of the toolbar is connected to a pair of parallel upright central panels which are connected to the central rear portion of the hood. A reinforcing member extends from the central rear portion between the central panels around the top of the hood adjacent the hitch structure which connects the implement to a tractor. The end and central panels and reinforced hood structure define a compact, unobtrusive frame which is sturdy enough to pull heavy drawbar loads and resist heavy torque loading. In one embodiment of the invention, the toolbar supports a plurality of transversely adjustable deep tillage tools such as rippers, and disk structure is connected by adjustable bracket structure to the toolbar behind the rippers. Transversely adjustable lift and transport wheels are also connected to the toolbar, along with transversely adjustable down-limit members for limiting disk lowering relative to the toolbar and supporting the disk structure above the ground when the wheels are lowered to raise the frame to the transport position. A variety of earthworking tools, including those presenting a heavy draft load, can be mounted on the toolbar. The locations of these tools along the toolbar can be varied using adjustable brackets to provide numerous implement combinations and arrangements. The toolbar support panels are narrow to minimize any interference with the adjustable brackets. The rear of the shredder can be provided with a variable opening or transversely spaced openings to advantageously control flow of shredded material relative to the trailing tools for optimum trash flow and controlled ground coverage.

The implement reduces the required capital investment of the farmer, decreases soil preparation time and operating costs, and reduces soil compaction. The implement has good trash handling characteristics and can operate in heavy residue conditions without clogging. The strong, compact frame structure including the rear toolbar accommodates numerous combinations of implements with the shredder, including deep tillage tools presenting high draft loads and high toolbar torque, and the implement may be used with either conventional or conservation tillage practices.

These and other objects, features and advantages of the present invention will become apparent from the drawings and the detailed description which follows.

DETAILED DESCRIPTION OF THE PREFERRED EMBODIMENT

Figure 1:
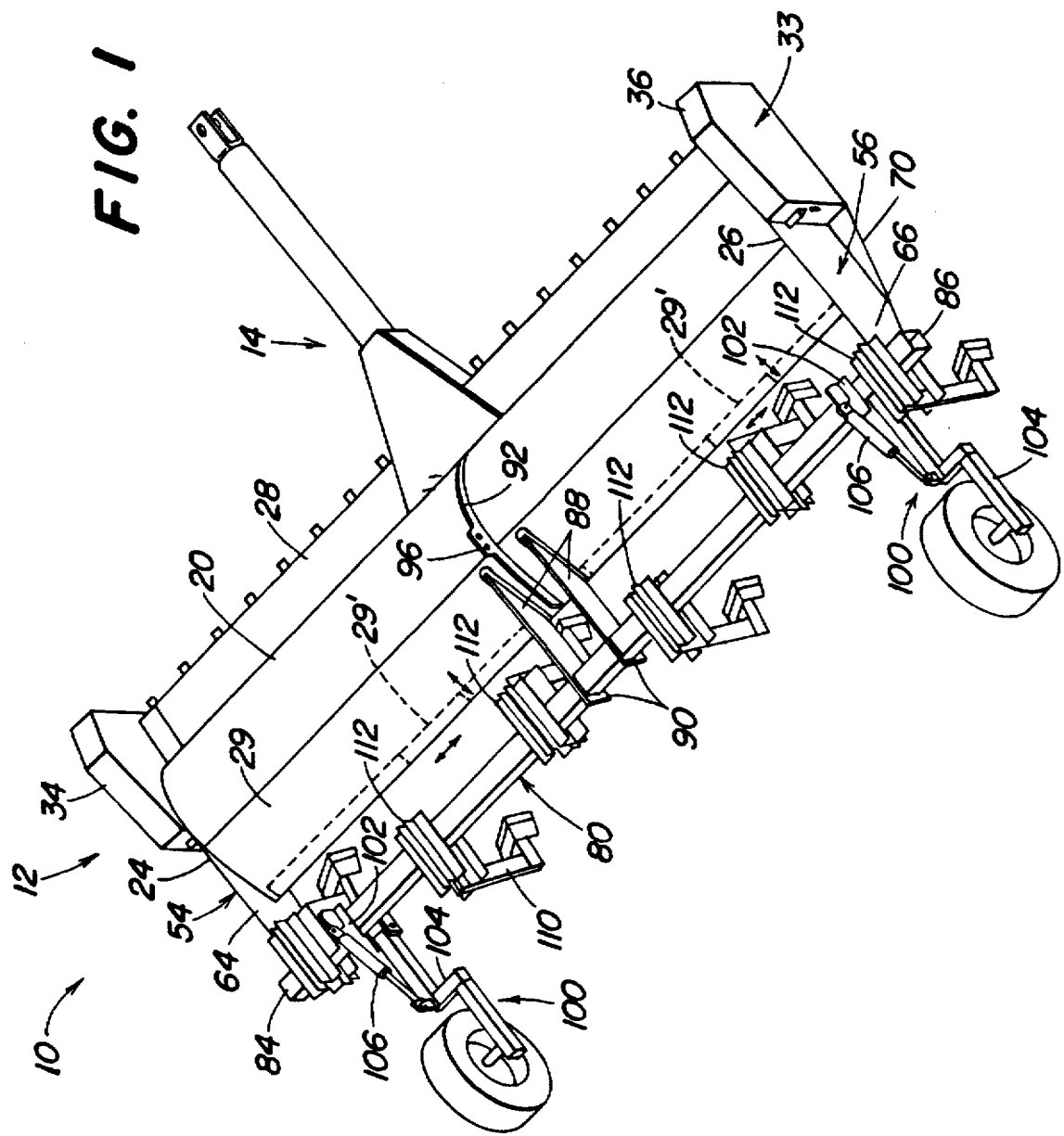
FIG. 1 is a rear perspective view of a portion of a conservation implement including a shredder having a plurality of deep tillage tools spaced on an integral toolbar.

Referring to FIG. 1, a combination implement 10 is shown including a shredder 12 having forward towing hitch structure 14 adapted for attachment to a tractor drawbar (not shown) for forward movement over a field where crop residue such corn stalks is present. In a second embodiment (FIG. 3), three point hitch structure 14' is connected to the shredder 12 for attaching the implement to the three point hitch on a tractor.

Figure 3:
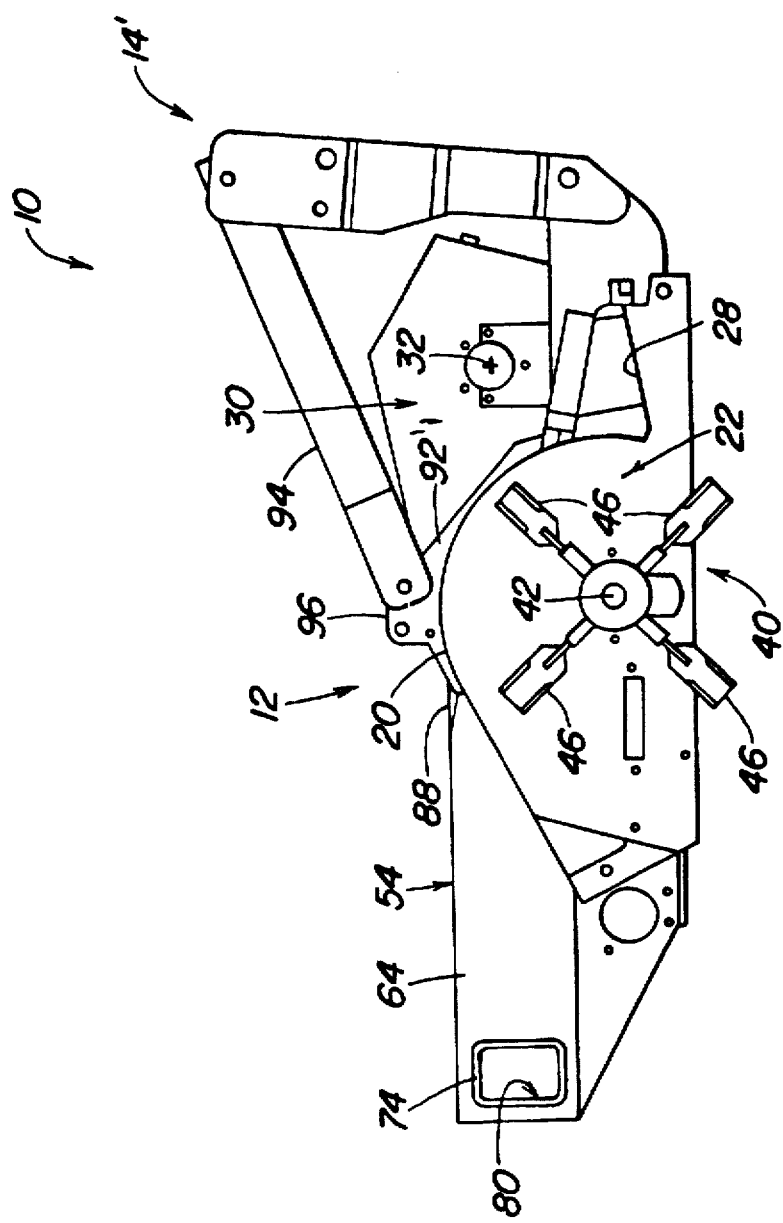
FIG. 3 is a side view, partially in section, of a portion of the a conservation implement similar to that shown in FIG. 1 but having an integral hitch adapted for attaching the implement to a three-point hitch of a tractor.

The shredder 12 includes metal hood structure 20 defining a curved, downwardly opening rotor compartment shown generally at 22 in FIG. 3 having opposite outer ends 24 and 26. A forward, transverse panel 28 extends substantially the width of the implement at the lower forward edge of the compartment 22 and is connected to the pull type hitch structure 14 (FIG. 1) or integral hitch 14' (FIG. 3). A rear panel 29 extends the width of the implement and generally closes the aft portion of the compartment. Alternatively, the panel 29 can define a pair of rear vertically adjustable hood portions, or a series of transversely spaced rearwardly directed openings 29' to selectively direct material relative to trailing tools. A conventional shredder drive assembly, a portion of which is shown at 30 in FIG. 3, is connected to the tractor PTO and to transverse shafts rotatable about an axis 32 to power belt drives 33 in drive compartments 34 and 36 located adjacent the ends 24 and 26, respectively. A rotor 40 (FIG. 3) is supported for rotation about a transverse axis 42 under the hood structure 20 in the compartment 22 and is driven from the tractor PTO through assembly 30 and the belt drives 33. Flails or knives 46 are supported from the rotor 40 for pulverizing plant material such as stubble and stalks.

End panels or plates 54 and 56 are fixed to the ends 24 and 26 to close the sides of the compartment 22 and provide support for the drives in the compartments 34 and 36. The plates 54 and 56 are preferably a unitary planar members with integral rearward extensions 64 and 66. Horizontally disposed gussets 68 and 70 are secured to the plates 54 and 56 adjacent the lower edges of the plates. The aft ends of the extensions 64 and 66 include rectangular apertures 74 and 76. A transverse toolbar 80 is supported from the end panels 54 and 56 a substantial distance behind the hood structure 20 above the level of the rotor axis 42 (FIGS. 2 and 3) and extends generally the width of the implement 10. The toolbar 80 is tubular in construction with a cross section conforming to the shape of the apertures 74 and 76. The toolbar 80 includes left and right ends 84 and 86 supported in the apertures and extending outwardly from the plates 54 and 56. The plates 54 and 56, which are welded to the ends 84 and 86, present a narrow profile to limit interference with various brackets, discussed in detail below, that are provided for attaching devices to the toolbar 80. Additional narrow upright plates 88 are fixed to the central portion of the hood structure 20 and have apertured aft ends 90 which receive and are welded to the central portion of the toolbar 80. A central reinforcing member 92 is connected to the hood structure 20 between the plates 88 and extends forwardly towards the front hitch 14 or 14'. In the integral hitch embodiment shown in FIG. 3, the upper portion of the three point hitch structure 14' is connected by a link 94 to an apertured projection 96 on the member 92. The above-described structure forms a sturdy implement frame arrangement capable of supporting implements that present a heavy draft load and/or a high torque load on the toolbar 80.

Lift and depth control wheel assemblies 100 (FIGS. 1, 2, and 4) are mounted at selected locations on the toolbar 80 by transversely adjustable brackets 102. Each of the assemblies 100 includes a wheel arm 104 pivotally connected to a lower portion of the bracket 102 for vertical movement relative to the toolbar 80 by a hydraulic cylinder 106 (FIGS. 1 and 2) extending between the arm and the upper portion of the bracket 102. The wheel assemblies 100 may be adjusted to any desired location along the toolbar 80 to accommodate different earthworking tools and different tool configurations.

As shown in FIG. 1, ripper standards 110 are spaced at selected locations along the toolbar 80 by transversely adjustable tool brackets 112. The brackets 112 facilitate mounting of the standards 110 either rearwardly or forwardly of the toolbar 80. As shown, the standards 110 are mounted in an alternating pattern to provide good soil and trash flow characteristics. Openings 29' (FIG. 1) may be provided to selectively direct the shredded trash relative to the standards 110. The rearward offset of the toolbar 80 provides ample space for the forwardly offset standards 110. Although ripper standards are shown, numerous other tillage tools, including spring trip shank and rigid shank mounted tools can also be attached to the toolbar 80. A variety of trailing implements, including disk harrow sections, tine tooth or spike tooth harrows, fertilizing, herbicide and insecticide equipment, treader wheels, incorporation wheels, row formers and stack pullers can also be connected to the toolbar 80. A second toolbar (not shown) can be bolted or welded to the implement if necessary to support the various tillage tools.

Figure 2:
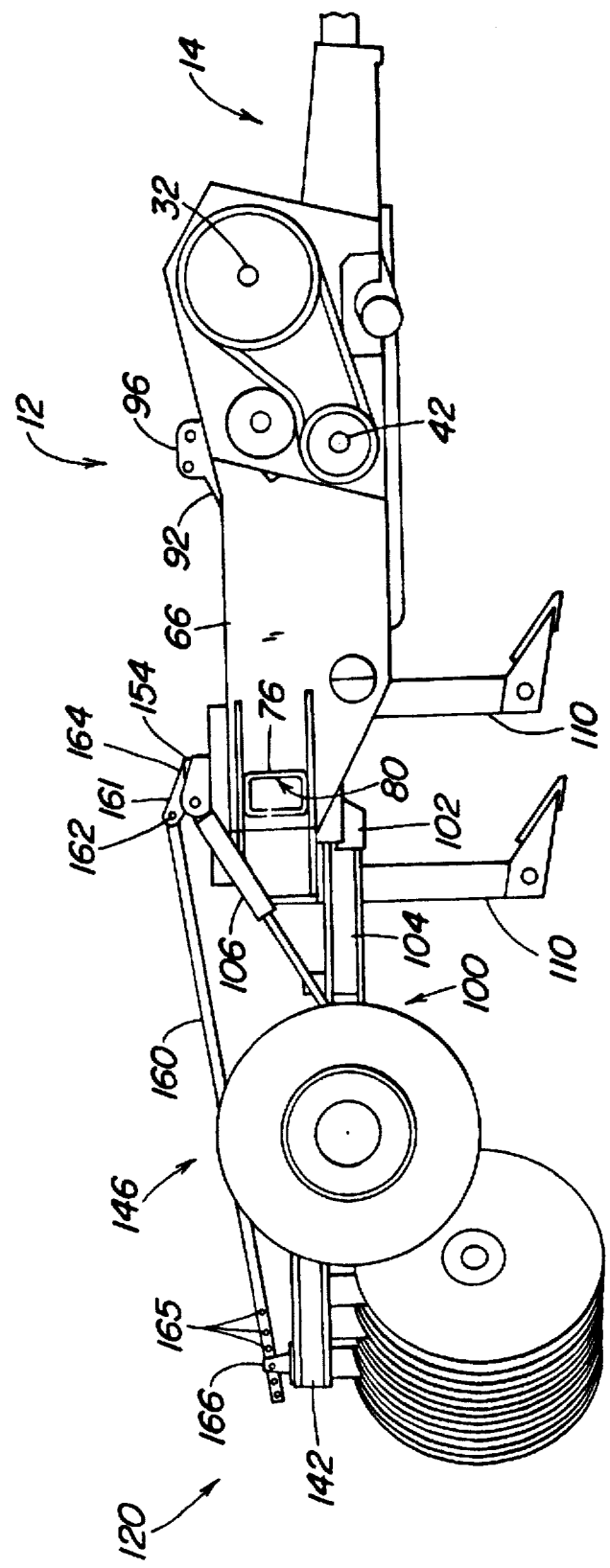
FIG. 2 is a side view of the implement of FIG. 1, but including a disk attached to the toolbar.
Figure 4:
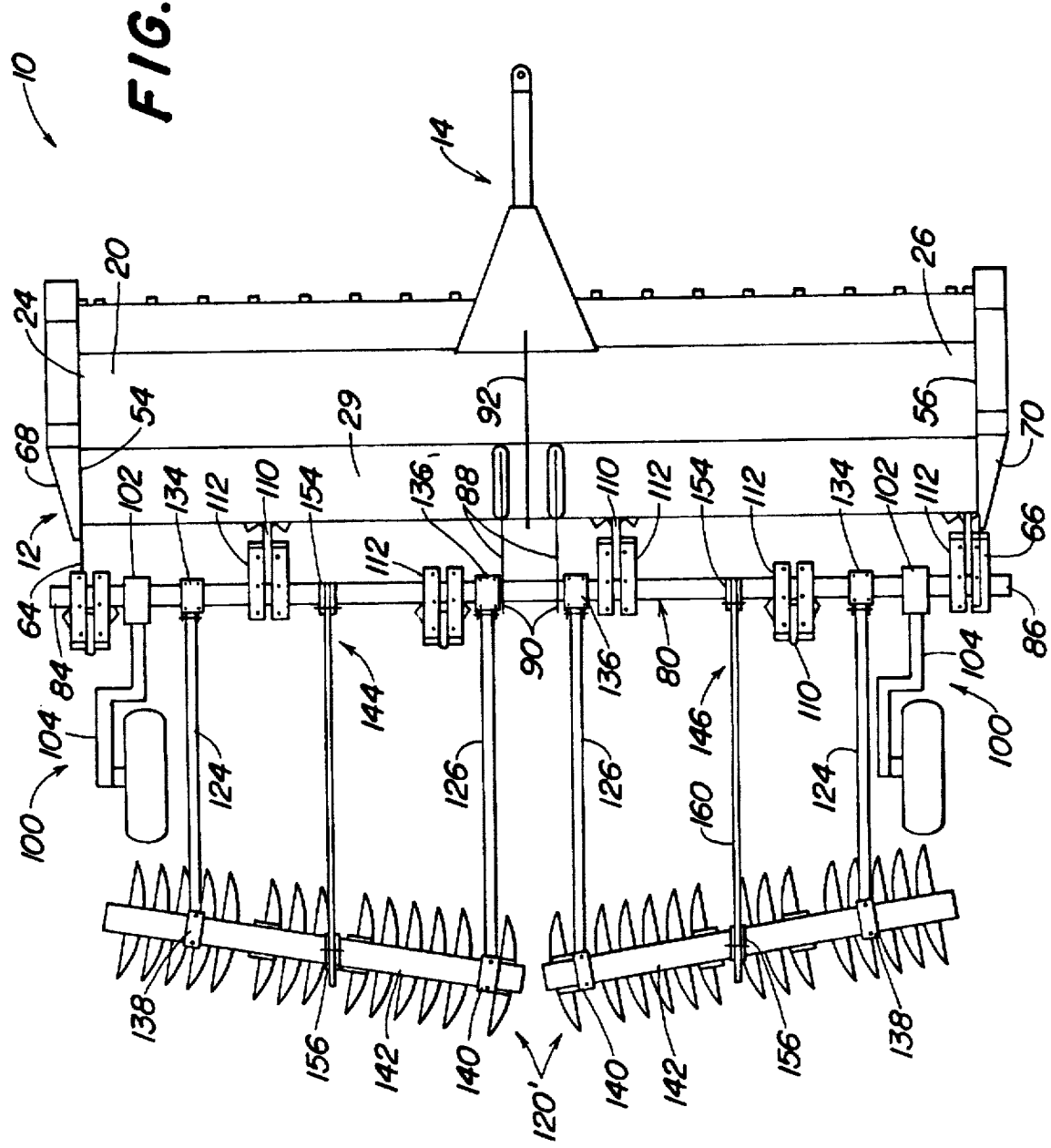
FIG. 4 is a top view of the implement of FIG. 1 with another disk implement attached to the toolbar.

In the embodiments of the invention shown in FIGS. 2 and 4, trailing disks 120 and 120' are connected to the toolbar 80 by transversely adjustable drawbar members 124 and 126. The forward ends of the drawbars 124 and 126 are pivotally connected to transversely adjustable drawbar brackets 134 and 136 mounted on the toolbar 80. The aft ends of the drawbars 124 and 126 are connected to brackets 138 and 140 which are connected to disk frames 142 and are transversely adjustable with respect to the frames. Down limit structures 144 and 146 are also adjustably connected to the toolbar 80 and the disk frames 142 by adjustable front and rear brackets 154 and 156. The front brackets 154 are transversely adjustable on the toolbar 80 between the tool brackets 112. The rear brackets 156 are transversely adjustable on the disk frames 142. As shown in FIG. 2, the down limit structures include a main link 160 pivotally connected to a short link 161 at a pivot location 162. The opposite end of the link is pivotally connected at 164 to the bracket 154 for rocking between a counterclockwise down limit position (FIG. 2) and a clockwise raised position. The aft end of the link 160 is apertured at 165 and is pivotally connected to a upright bracket 166 to limit the lowermost position of the disks 120 relative to the frame 80. The lowermost position of the disks 120 can be adjusted by changing the aperture 165 which is aligned with and pinned to a corresponding aperture in the bracket 166.

The above-described implement has good trash handling characteristics and can operate in heavy residue conditions without clogging. The strong, compact frame structure including the rear toolbar 80 accommodates numerous combinations of implements with the shredder, including deep tillage tools presenting high draft loads and high toolbar torque. The tools, lift wheels, and trailing implements can be easily mounted on and removed from the toolbar 80 and adjusted transversely on the toolbar as necessary for different operating conditions. The implement is easily adaptable for use with either the towing hitch structure 14 wherein the wheel assemblies provide substantially all of the lift function or the integral three point hitch structure 14' wherein the hitch itself provides lift for the shredder and attached tools. When the lift wheel assemblies 100 are attached, substantially all of the lift structure is supported from the toolbar below the uppermost portion of the hood structure.

Having described the preferred embodiment, it will become apparent that various modifications can be made without departing from the scope of the invention as defined in the accompanying claims.

We claim:

1. An implement including a shredder adapted for towing forwardly over a field wherein plant debris is located, the shredder including a transversely extending rotor for contacting and shredding the plant debris, transverse hood structure extending over the rotor for containing material contacted by the rotor, the hood structure having opposite ends, end panels connected to the opposite ends and generally closing the ends, the end panels having integral planar extensions projecting rearwardly of the shredder and defining support areas, a transversely extending toolbar fixed to the support areas, earthworking tools, and first adjustable bracket structure connecting the earthworking tools to the toolbar at selectable locations along the toolbar, wherein the support areas have narrow profiles to minimize interference with the adjustable bracket structure when the selectable locations are near the support areas.

2. The invention as set forth in claim 1 further including central panel structure fixed to the toolbar and to the hood structure at a central hood location, wherein the end panels and central panel structure provide vertical and lateral toolbar support and torque resistance.

3. The invention as set forth in claim 2 further including a reinforcing member extending over the hood structure at the central hood location.

4. The invention as set forth in claim 2 wherein the end panels are substantially vertical and include a lower edges extending rearwardly from the hood, and further including a horizontally disposed gussets adjacent the lower edges, and wherein the central panel structure includes an upright panel generally parallel to the end panels.

5. The invention as set forth in claim 1 including rotor drive structure and wherein at least one of the end panels defines a rotor drive structure support.

6. The invention as set forth in claim 1 wherein the toolbar includes ends which project through apertures in the rearward extensions.

7. The invention as set forth in claim 1 further comprising a fore-and-aft extending tool support having a forward end and an aft end, and second adjustable bracket structure supporting the forward end of the tool support at one of a plurality of transverse locations along the toolbar.

8. The invention as set forth in claim 7 including an earthworking implement connected to the aft end of the tool support.

9. The invention as set forth in claim 8 wherein the earthworking implement comprises a disk, and wherein the tool support is pivotally connected to the second adjustable bracket structure to permit the disk to float vertically relative to the toolbar.

10. The invention as set forth in claim 9 further comprising lift wheel structure supported from, and transversely adjustable on, the toolbar for selectively moving the earthworking tools between a lowered field working position and a raised transport position.

11. The invention as set forth in claim 9 further comprising a pivoting down limit link connected between the disk and the toolbar for limiting downward movement of the disk relative to the toolbar.

12. The invention as set forth in claim 10 including forward towing hitch structure, and wherein the lift wheel structure includes transversely spaced wheels supported behind the toolbar and forwardly of the disk, the lift wheel structure providing implement lift from a location rearwardly of the rotor.

13. The invention as set forth in claim 2 further comprising three point hitch mounting structure connected to the hood structure at the central hood location, wherein the central panel structure includes an upper portion extending over the hood structure and a pair of spaced plates located on opposite sides of the upper portion and projecting rearwardly therefrom to connections with the toolbar.

14. An implement including a shredder adapted for towing forwardly over a field wherein plant debris is located on the surface of soil, the shredder including a rotor rotatable about a generally horizontal axis for contacting and shredding the plant debris, hood structure extending over the rotor for containing material contacted by the rotor, the hood structure having opposite ends, end panels connected to the opposite ends and generally closing the ends, aft support portions extending rearwardly from the end panels, a transversely extending toolbar fixed to the support areas and offset rearwardly of the hood structure, earthworking tools, adjustable bracket structure connecting the earthworking tools to the toolbar with the tools depending from the toolbar and penetrating the surface of the soil, and implement lift structure offset from the horizontal axis, wherein the aft support portions maintain the toolbar fixed relative to the hood structure and the toolbar and aft support portions cooperate with the hood structure to form an unobtrusive frame to resist heavy torque loading independent of any additional main support frame structure extending around the hood structure.

15. The invention as set forth in claim 14 wherein the implement lift structure includes integral three point hitch structure.

16. The invention as set forth in claim 14 wherein the hood structure includes an uppermost portion and the lift structure includes transversely adjustable lift wheel structure connected to the toolbar, wherein substantially all of the lift structure is supported from the toolbar below an uppermost portion of the hood structure.

17. The invention as set forth in claim 14 wherein the aft support portions comprise upright, narrow plates to minimize interference with the adjustable bracket structure.

18. The invention as set forth in claim 14 wherein the toolbar is located above a substantially horizontal plane passing through the horizontal axis.

19. The invention as set forth in claim 15 wherein the support portions are integral with the end panels and further including a central reinforcing member connected to the hood structure and central panel structure connected to the hood structure adjacent the central reinforcing member and extending rearwardly therefrom to a supporting connection with a central portion of the toolbar, and wherein a portion of the three point hitch structure is connected to the central reinforcing member.

20. The invention as set forth in claim 14 including fore-and-aft extending drawbar members having forward ends and aft ends, the forward ends connected to the toolbar, a disk connected to the aft ends of the drawbar members, and wherein the lift structure moves the toolbar between a raised transport position wherein the earthworking tools are raised above the ground and a lowered field working position, and further comprising adjustable down-limit structure supporting the disk from the toolbar when the toolbar is in the raised transport position.

21. The invention as set forth in claim 14 wherein the hood structure includes rear panel structure selectively directing shredded plant debris relative to the earthworking tools.

* * * * *